United States Patent
Son et al.

(10) Patent No.: US 9,745,881 B2
(45) Date of Patent: *Aug. 29, 2017

(54) SYSTEM FOR RECYCLING EXHAUST HEAT FROM INTERNAL COMBUSTION ENGINE

(71) Applicant: Hyundai Motor Company, Seoul (KR)

(72) Inventors: You Sang Son, Suwon-si (KR); Sei Young Kim, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 212 days.

This patent is subject to a terminal disclaimer.

(21) Appl. No.: 14/529,790

(22) Filed: Oct. 31, 2014

(65) Prior Publication Data

US 2015/0176466 A1     Jun. 25, 2015

(30) Foreign Application Priority Data

Dec. 23, 2013 (KR) .................. 10-2013-0161695

(51) Int. Cl.
  *F02B 33/44*    (2006.01)
  *F01K 23/10*    (2006.01)
  (Continued)

(52) U.S. Cl.
  CPC ............. *F01N 5/02* (2013.01); *F01K 23/065* (2013.01); *F02G 5/04* (2013.01); *F02M 26/25* (2016.02); *F02M 26/28* (2016.02); *F02M 26/30* (2016.02); *F02M 26/32* (2016.02); *F28D 7/16* (2013.01); *F28F 9/028* (2013.01); *F28F 9/22* (2013.01); *F01P 3/2285* (2013.01);
  (Continued)

(58) Field of Classification Search
  CPC ........ F02M 26/25; F02M 26/28; F02M 26/30; F02M 26/32; F01N 5/02; F28F 9/028; F28F 9/22; F02G 5/04
  USPC ................... 60/616–620, 605.2; 123/568.11
  See application file for complete search history.

(56) References Cited

U.S. PATENT DOCUMENTS

2005/0262842 A1* 12/2005 Claassen .................. F02G 5/02
                                                             60/618
2009/0211253 A1*  8/2009 Radcliff ................ F01K 23/065
                                                             60/670
(Continued)

FOREIGN PATENT DOCUMENTS

AT           507 096 A4    2/2010
DE    10 2008 064 015 A1   7/2010
(Continued)

*Primary Examiner* — Jason Shanske
*Assistant Examiner* — Ngoc T Nguyen
(74) *Attorney, Agent, or Firm* — Morgan Lewis & Bockius LLP (57) ABSTRACT

A system for recycling exhaust heat from an internal combustion engine is based on a recycling type of circulating a working fluid using the exhaust heat from the internal combustion engine. The system may include an EGR line configured to circulate a portion of exhaust gas generated from the internal combustion engine to an intake side, a working fluid circulation line configured to rotate a turbine with a working fluid vaporized by heat transferred from the EGR line, and an EGR side heat exchange unit configured to thermally connect the EGR line to the working fluid circulation line to cool an EGR gas by transferring heat from the EGR gas to the working fluid.

20 Claims, 8 Drawing Sheets

(51) Int. Cl.
  *F02B 47/08* (2006.01)
  *F01N 5/02* (2006.01)
  *F02G 5/04* (2006.01)
  *F01K 23/06* (2006.01)
  *F28F 9/02* (2006.01)
  *F28F 9/22* (2006.01)
  *F28D 7/16* (2006.01)
  *F02M 26/25* (2016.01)
  *F02M 26/28* (2016.01)
  *F02M 26/30* (2016.01)
  *F02M 26/32* (2016.01)
  *F01P 3/22* (2006.01)

(52) U.S. Cl.
  CPC .... *F02G 2260/00* (2013.01); *F28F 2009/226* (2013.01); *Y02E 20/14* (2013.01); *Y02T 10/16* (2013.01); *Y02T 10/166* (2013.01)

(56) References Cited

U.S. PATENT DOCUMENTS

| | | | | |
|---|---|---|---|---|
| 2009/0241543 A1* | 10/2009 | Ernst | ............ | F01K 9/04 60/661 |
| 2009/0260775 A1* | 10/2009 | Maucher | ............ | F02G 5/02 165/41 |
| 2010/0139626 A1 | 6/2010 | Raab et al. | | |
| 2010/0156112 A1* | 6/2010 | Held | ............ | F01K 3/185 60/643 |
| 2012/0023946 A1* | 2/2012 | Ernst | ............ | F02G 5/02 60/660 |
| 2012/0073294 A1* | 3/2012 | Enokijima | ............ | F01K 23/065 60/660 |
| 2012/0192560 A1* | 8/2012 | Ernst | ............ | F01K 23/065 60/616 |
| 2012/0204558 A1* | 8/2012 | Stegmaier | ............ | F02M 26/34 60/605.2 |
| 2015/0184551 A1* | 7/2015 | Son | ............ | F01K 23/065 60/597 |

FOREIGN PATENT DOCUMENTS

| | | | | |
|---|---|---|---|---|
| FR | 2 964 412 A1 | 3/2012 | | |
| GB | 2471666 A | 1/2011 | | |
| JP | 2004-346843 A | 12/2004 | | |
| JP | 2007-255278 A | 10/2007 | | |
| JP | CA 2812160 A1 * | 4/2012 | ............ | F02G 5/02 |
| JP | 2013-053620 A | 3/2013 | | |
| JP | WO 2013099769 A1 * | 7/2013 | ............ | F01K 23/065 |
| JP | 2013-181394 A | 9/2013 | | |
| JP | WO 2013172293 A1 * | 11/2013 | ............ | F01K 23/065 |
| JP | 2014190170 A * | 10/2014 | | |
| KR | 10-2012-0058582 A | 6/2012 | | |
| KR | 10-2013-0032228 A | 4/2013 | | |
| WO | WO 2011/136118 A1 | 11/2011 | | |
| WO | WO 2012/088532 A1 | 6/2012 | | |
| WO | WO 2013/046853 A1 | 4/2013 | | |
| WO | WO 2013/172293 A1 | 11/2013 | | |

\* cited by examiner

SYSTEM FOR RECYCLING EXHAUST HEAT FROM INTERNAL COMBUSTION ENGINE

CROSS-REFERENCE TO RELATED APPLICATION

The present application claims priority of Korean Patent Application Number 10-2013-0161695 filed on Dec. 23, 2013, the entire contents of which application are incorporated herein for all purposes by this reference.

BACKGROUND OF INVENTION

Field of Invention

The present invention relates to a system for recycling exhaust heat from an internal combustion engine, and more particularly, to a system for recycling exhaust heat from an internal combustion engine including a recycling method which circulates a working fluid using the exhaust heat from the internal combustion engine.

Description of Related Art

An internal combustion engine has been widely used in a vehicle, a ship, a small power plant, and the like, and attempts to increase efficiency of the internal combustion engine have been continuously conducted. In the internal combustion engine, a large quantity of heat is generally discharged as exhaust heat. Therefore, various types of systems to increase the overall efficiency of internal combustion engine by recovering the exhaust heat have been developed.

Considering the increase in the number of apparatuses and components required to configure an exhaust heat recovery system and the increase in a load, it is more efficient to mount a system for recycling exhaust heat in a large vehicle which has a displacement volume larger and transports persons or freights more than a small vehicle having a small displacement volume.

In the case of a vehicle, a representative system for recycling exhaust heat may include a system using a turbo compound and a system using a thermoelectric element.

The system using a turbo compound is a type that attaches an exhaust turbine to an exhaust line and rotates the exhaust turbine with an exhaust pressure to obtain an output. The type may increase the overall thermal efficiency of the system in which the internal combustion engine is mounted, but since the exhaust turbine acts as an exhaust resistance, reduces the output of the engine.

The system using a thermoelectric element is a type which charges electricity using a thermoelectric element which generates electricity due to a difference in temperature and drives an auxiliary motor with the generated electricity to supplement a role of the engine. However, since the costs of the thermoelectric element may not be disregarded and a space in which the thermoelectric element may be mounted is narrow, it is not easy to significantly increase the thermal efficiency of the engine even though the thermoelectric element is mounted in the actually produced vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a system for efficiently recycling exhaust heat from an internal combustion engine without reducing an output of the internal combustion engine. Further, the present invention has been made in an effort to provide a system for recycling exhaust heat from an internal combustion engine without hindering a discharge of exhaust gas.

In various aspects of the present invention, there is provided a system for recycling exhaust heat from an internal combustion engine, including: an Exhaust Gas Recirculation (EGR) line configured to circulate a portion of exhaust gas generated from the internal combustion engine to an intake side, a working fluid circulation line configured to rotate a turbine with a working fluid vaporized by heat transferred from the EGR line, and an EGR side heat exchange unit configured to thermally connect the EGR line to the working fluid circulation line to cool an EGR gas by transferring heat from the EGR gas to the working fluid. The working fluid may meet a Rankine cycle condition.

The system for recycling exhaust heat from an internal combustion engine may further include an exhaust side heat exchange unit configured to be mounted in an exhaust line discharging the exhaust gas to an outside to transfer heat from the exhaust gas to the working fluid.

The system for recycling exhaust heat from an internal combustion engine may further include a motor generator configured to rotate along with a rotating shaft of the turbine, wherein the motor generator may be supplied with a rotating force from the turbine to be stored in a battery or supply power to the rotating shaft mounted in the internal combustion engine and may be supplied with the power from the battery to supply power to the rotating shaft mounted in the internal combustion engine.

The working fluid may pass through the exhaust side heat exchange unit at all time and the working fluid may pass through the EGR side heat exchange unit only when a temperature of the EGR gas flowing along the EGR line is equal to or greater than a specific temperature T1. The specific temperature T1 may be 500° C. The exhaust side heat exchange unit may be disposed at an upstream side of the working fluid circulation line with regard to the EGR side heat exchange unit.

The system for recycling exhaust heat from an internal combustion engine may further include a reservoir tank configured to be stored with a working fluid in a liquid state and have an inlet and an outlet, and a recuperator configured to be fluidically-communicated with both of the inlet and the outlet of the reservoir tank to facilitate heat-exchange between the working fluid introduced into the reservoir tank and the working fluid discharged from the reservoir tank. The recuperator may be disposed at an upstream side of the reservoir tank based on the inlet and a downstream side of the reservoir tank based on the outlet.

The exhaust side heat exchange unit may be disposed at a downstream side of a post-processing unit disposed in the exhaust line to reduce pollutants of the exhaust gas.

The EGR side heat exchange unit may include an EGR cooler configured to cool the EGR gas; and a super heater configured to transfer the heat from the EGR gas to the working fluid passing through the exhaust side heat exchange unit. The super heater may be disposed upstream of the EGR cooler based on a flow of the EGR gas introduced into the EGR side heat exchange unit.

The exhaust side heat exchange unit may include an exhaust gas pipe through which the exhaust gas flows, a heat exchange chamber configured to have the exhaust pipe received therein and include a chamber inlet into which the working fluid is introduced and a chamber outlet through which the working fluid is discharged, and baffles configured to partition an internal space of the heat exchange chamber into a plurality of areas along a longitudinal direction of the exhaust pipe, wherein at least one of the baffles may be provided with communication holes through which the working fluid moves from one area of the internal space of the heat exchange chamber to another area adjacent thereto.

The communication holes formed in any one of the at least one of the baffles and the communication holes formed in another one of the at least one of the baffles adjacent thereto may be aligned across the corresponding baffles.

The exhaust side heat exchange unit may include a nozzle plate configured to be formed in an inlet area which is an area connected to the chamber inlet among the plurality of areas formed in the heat exchange chamber in a state in which the nozzle plate is spaced apart from an inner side of the heat exchange chamber and have a plurality of spray holes to atomize the working fluid. An internal space side end of the heat exchange chamber at the chamber inlet may have a funnel shape.

The system for recycling exhaust heat from an internal combustion engine may further include a working fluid pump configured to be disposed between the reservoir tank and the recuperator, wherein a pipe connecting the reservoir tank with the working fluid pump may be insulated.

The working fluid circulation line may further include a working fluid bypass configured to connect a point between the EGR side heat exchange unit and the turbine and a point between the turbine and the recuperator, and a working fluid bypass valve configured to be mounted in the working fluid bypass to selectively bypass the working fluid to the recuperator.

The working fluid circulation line may further include an oil separator configured to be formed in a pipe between the turbine and the recuperator to separate a turbine lubricant discharged from the turbine. The working fluid circulation line may further include a TEG condenser configured to be disposed between the inlet of the reservoir tank and the recuperator to deprive the working fluid of a quantity of heat.

The working fluid circulation line may further include a cooling fan and the pipe between the recuperator and the TEG condenser may be configured to include a working fluid radiator which is bent a plurality of times to increase cooling efficiency and the working fluid radiator may be cooled by the cooling fan.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms and words used in the present specification and claims are not to be construed as a general or dictionary meaning but are to be construed as a meaning and concepts meeting the technical ideas of the present invention based on a principle that the inventors can appropriately define the concepts of terms in order to describe their own inventions in best mode.

Sizes, shapes, or the like of components illustrated in the drawings may be exaggerated or simplified for clarity and convenience. The size of each component does not exactly reflect its real size. Further, when it is determined that the detailed description of the known function or configuration related to the present invention may obscure the gist of the present invention, the detailed description thereof will be omitted.

Figure 1A:
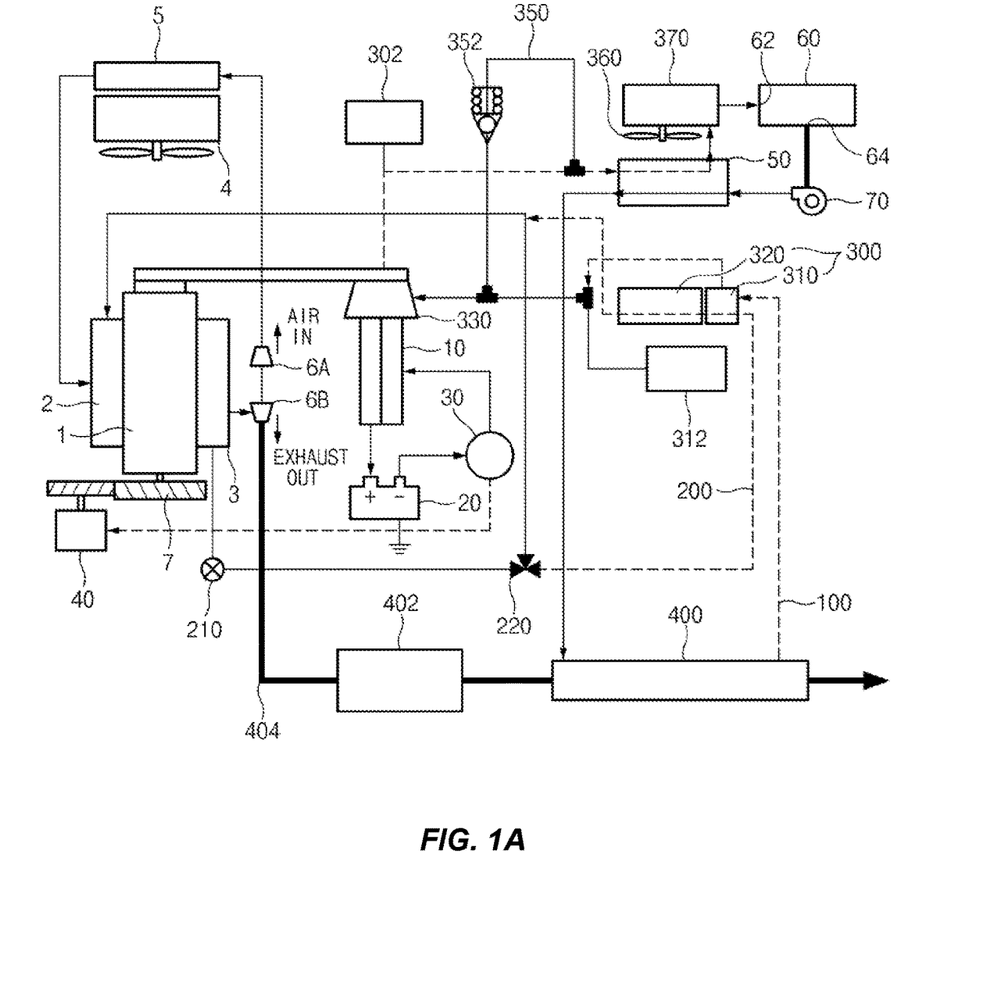
FIGS. 1A and 1B are conceptual diagrams of an exemplary system for recycling exhaust heat from an internal combustion engine according to the present invention.
Figure 1B:
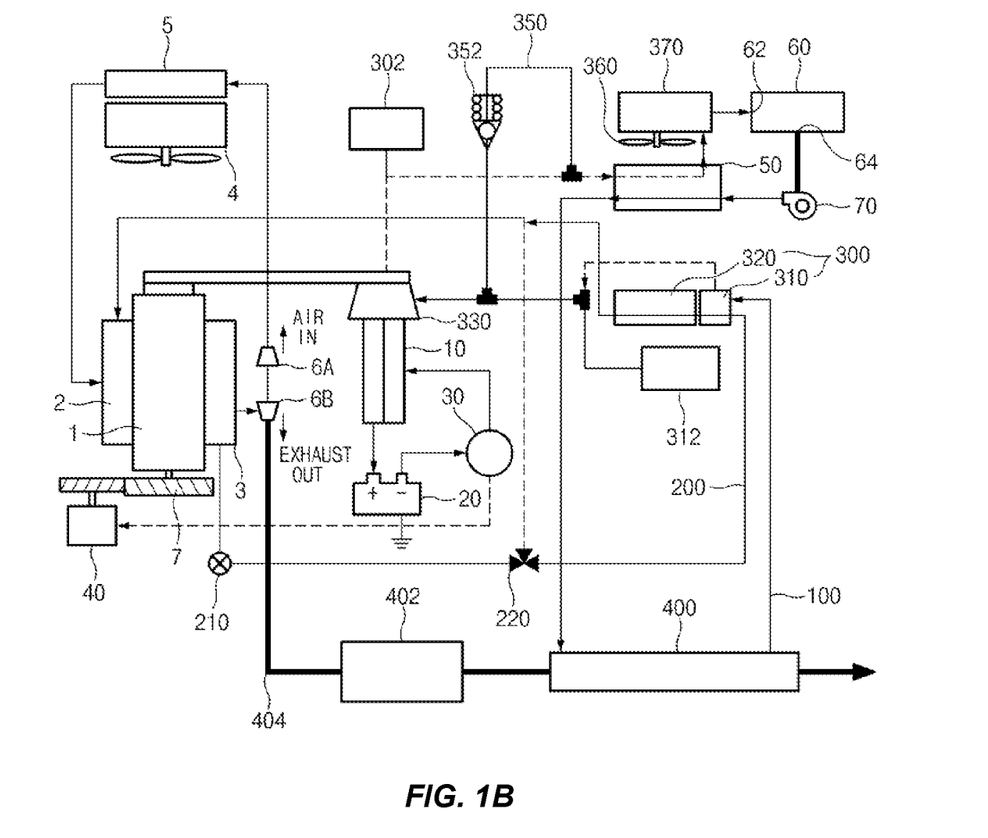

FIGS. 1A and 1B is a conceptual diagram of a system for recycling exhaust heat from an internal combustion engine according to various embodiments of the present invention. Referring to FIGA. 1A and 1B, the system for recycling exhaust heat from an internal combustion engine (hereinafter, referred to as 'recycling system') according to various embodiments of the present invention includes an EGR line 200 configured to circulate a portion of exhaust gas generated from the internal combustion engine to an intake side, a working fluid circulation line 100 configured to rotate a turbine 330 with a working fluid vaporized by heat transferred from the EGR line 200, and an EGR side heat exchange unit 300 configured to transfer heat from EGR gas to the working fluid.

Further, the recycling system further includes an exhaust side heat exchange unit 400 configured to be mounted in the exhaust line discharging the exhaust gas to the outside to transfer the heat from the exhaust gas to the working fluid.

The working fluid passes through the exhaust side heat exchange unit 400 at all times as shown in FIGS. 1A and 1B but passes through the EGR side heat exchange unit 300 only when a temperature of the exhaust gas flowing along the EGR line 200 is equal to or larger than a specific temperature T1 as shown in FIG. 1B. Based on a diesel engine 1, T1 may be set to be 500° C. or about 500° C.

Hereinafter, a circulation path passing through the EGR line 200 of the EGR gas when the T1 is set to be 500° C. will be described by way of example.

When the EGR gas applied to an EGR bypass valve 220 through an EGR valve 210 from an exhaust manifold 3 is equal to or larger than 500° C., the EGR bypass valve 220 is opened, and thus the EGR gas moves to the right of the EGR bypass valve 220, passes through the EGR side heat exchange unit 300, and is supplied to an intake manifold 2 side as illustrated in FIG. 1B. On the other hand, when the EGR gas is less than 500° C., the EGR bypass valve 220 is closed, and thus the EGR gas moves up the EGR bypass valve 220 and is supplied to the intake manifold 2 side without passing through the EGR side heat exchange unit 300 as illustrated in FIG. 1A.

As described above, when the temperature of the exhaust gas becomes low as in a starting of an initial engine, the engine 1 may be rapidly preheated by directly introducing the EGR gas into the intake manifold 2 while preventing the EGR gas from passing through the EGR side heat exchange unit 300 and the exhaust heat may be recycled by applying the exhaust gas to the EGR side heat exchange unit 300 after the temperature of the exhaust gas is sufficiently increased.

Meanwhile, the EGR side heat exchange unit 300 thermally connects the EGR line 200 to the working fluid circulation line 100, heat-exchanges the EGR gas with the working fluid to cool the EGR gas, and transfers the heat from the EGR gas to the working fluid. Further, the EGR side heat exchange unit 300 includes an EGR cooler 320 configured to cool the EGR gas and a super heater 310 configured to transfer the heat from the EGR gas to the working fluid passing through the exhaust side heat exchange unit 400.

Based on a flow of the EGR gas introduced into the EGR side heat exchange unit 300, the super heater 310 may be disposed above the EGR cooler 320. In this case, the EGR gas may transfer a large quantity of heat to the working fluid while passing through the super heater 310 and since the EGR gas having a quantity of heat which is not yet transferred to the working fluid is cooled by the EGR cooler 320, the working fluid may recover a quantity of heat as large as possible from the EGR gas.

Hereinafter, a path along which the working fluid is circulated on the working fluid circulation line 100 will be described.

The working fluid is supplied to a working fluid pump 70 through an outlet 64 of a reservoir tank 60 which is stored with a working fluid in a liquid state and has an inlet 62 and the outlet 64 and the working fluid pumped by the working fluid pump 70 is heated, passing through a recuperator 50. The working fluid passing through the recuperator 50 is supplied to the exhaust side heat exchange unit 400 and is supplied with heat again, and is supplied with heat through the super heater 310 which is mounted in the EGR side heat exchange unit 300. The working fluid in a liquid state which is not yet vaporized until passing through the super heater 310 is separated by a gas/liquid separator 312 and a turbine 330 is supplied with only the working fluid in a gas state which passes through the super heater 310.

That is, the working fluid is supplied with heat from the recuperator 50 and since the exhaust side heat exchange unit 400 is disposed at an upstream side of the working fluid circulation line 100 above the EGR side heat exchange unit 300, is additionally supplied with heat while passing through the exhaust side heat exchange unit 400 and the EGR side heat exchange unit 300 in order.

The working fluid in a gas state is supplied to the turbine 330 to rotate the turbine 330 and the working fluid from which energy is lost passes through the recuperator 50 and returns to the inlet 62 of the reservoir tank 60, by the rotation of the turbine 330.

The working fluid circulated through the path may meet a Rankine cycle condition, in which the Rankine cycle is a cycle which is configured of two adiabatic changes and two isobaric changes and means a cycle involving a phase change in liquid. The Rankine cycle is one of the cycles which has been widely known and therefore the detailed description thereof will be omitted.

The recuperator 50 fluidically-communicates with both of the inlet 62 and the outlet 64 of the reservoir tank 60 to heat-exchanges the working fluid introduced into the reservoir tank 60 with the working fluid discharged from the reservoir tank 60.

In view of the working fluid flowing out from the outlet 64 of the reservoir tank 60, the working fluid is heated by being supplied with the heat from the working fluid passing through the turbine 330 and then introduced into the recuperator 50, while in view of the working fluid passing through the turbine 330 and then introduced into the recuperator 50, the working fluid is cooled by the working fluid flowing out from the outlet 64 of the reservoir tank 60. As described above, the recuperator 50 is disposed at the upstream side of the reservoir tank 60 based on the inlet 62 of the reservoir tank 60 and is disposed at a downstream side of the reservoir tank 60 based on the outlet 64 of the reservoir tank 60 to be able to stably supply the working fluid supplied to the reservoir tank 60 in a liquid state and previously heats the working fluid prior to being supplied to the exhaust side heat exchange unit 400 to be able to increase the recovery efficiency of exhaust heat.

Figure 2:
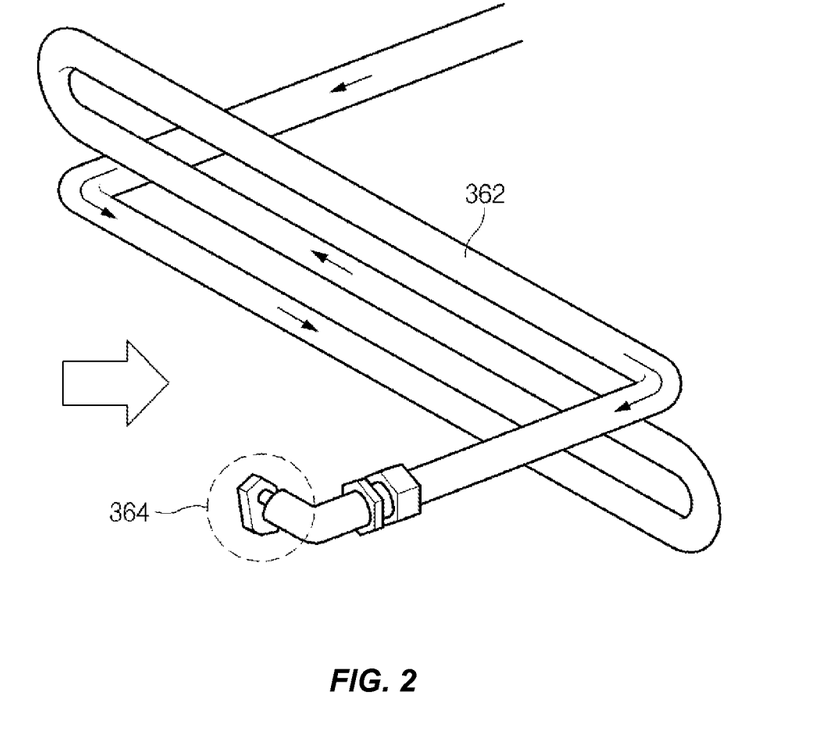
FIG. 2 is a perspective view of an exemplary working fluid radiator.

FIG. 2 is a perspective view of a working fluid radiator. Referring to FIGS. 1 and 2, the working fluid circulation line 100 may include a TEG condenser 370 and a cooling fan 360.

The TEG condenser 370 is disposed between the inlet 62 of the reservoir tank 60 and the recuperator 50 to deprive the working fluid of its quantity of heat, thereby serving to make the working fluid flowing in the reservoir tank 60 the liquid state. Further, a pipe between the recuperator 50 and the TEG condenser 370 may be formed of a working fluid radiator 362 which is bent plural times to increase the cooling efficiency, in which the working fluid radiator 362 may be cooled by the cooling fan 360. An end 364 of the working fluid radiator 362 is connected to the TEG condenser 370 side, such that the working fluid cooled by the working fluid radiator 362 and the cooling fan 360 may be additionally cooled by the TEG condenser 370.

Meanwhile, the working fluid pump 70 is disposed between the reservoir tank 60 and the recuperator 50 and when the working fluid flowing along a pipe connecting the reservoir tank 60 with the working fluid pump 70 is vaporized by absorbing heat from the surroundings, pumping efficiency may be reduced. To prevent the pumping efficiency from reducing, the pipe connecting the reservoir tank 60 with the working fluid pump 70 may be insulated.

In the working fluid circulation line 100, a point between the EGR side heat exchange unit 300 and the turbine 330 and a point between the turbine 330 and the recuperator 50 are connected to each other by a working fluid bypass 350 and the working fluid bypass 350 is provided with a working fluid bypass valve 352 which selectively bypasses the working fluid to the recuperator 50.

When the working fluid is above a specific temperature and pressure, a molecular structure is destructed and thus an intrinsic physical value of the working fluid may be lost. When the working fluid losses the intrinsic physical value, the working fluid is supplied to the recuperator 50 by using the working fluid bypass valve 352 to make the working fluid a normal state prior to passing through the turbine 330. The working fluid bypassed to the recuperator 50 may return to the normal state by passing through the recuperator 50.

Figure 3:
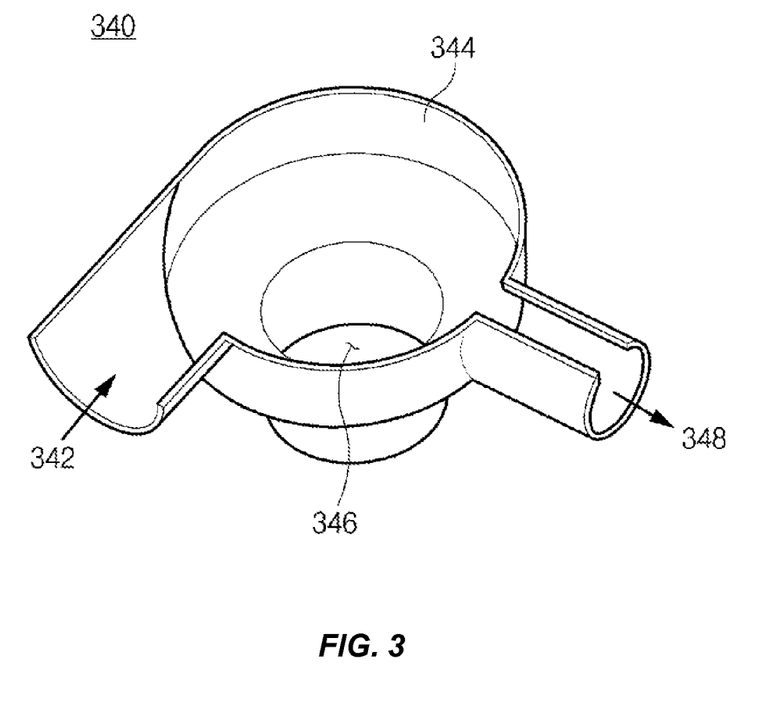
FIG. 3 is a perspective view of an exemplary oil separator.

FIG. 3 is a perspective view of an oil separator. Circulating only the working fluid in the working fluid circulation line 100 is ideal, but the high-temperature working fluid rotates the turbine 330 and to prevent the turbine 330 from being damaged due to the high-speed rotation, the turbine 330 is lubricated by a turbine lubricant. Therefore, the working fluid passing through the turbine 330 may be mixed with the turbine lubricant and an oil separator 340 to separate other fluids in addition to the turbine lubricant discharged from the turbine 330, not the working fluid, from the working fluid circulation line 100 may be formed in the pipe between the turbine 330 and the recuperator 50, and an exemplary structure of the oil separator 340 is illustrated in FIG. 3.

A wall portion is formed between an inlet 342 of the oil separator 340 and an outlet 348 of the oil separator 340 and the inlet 342 of the oil separator 340 and the outlet 348 of the oil separator 340 are not parallel with each other but may be disposed at a right angle to each other, having, for example, the wall portion 344 disposed therebetween. In this case, the turbine lubricant is discharged through a separation hole 346, which is formed under the wall portion 344, while the working fluid mixed with the turbine lubricant introduced into the inlet 342 of the oil separator 340 at a high speed collides with the wall portion 344 and the turbine lubricant may be supplied to the turbine 330 again. Further, the working fluid from which the turbine lubricant component is separated is introduced into the recuperator 50 through the outlet 348 of the oil separator 340. The working fluid introduced into the recuperator 50 is cooled by passing through the recuperator 50, the working fluid radiator 362, and the TEG condenser 370 as described above.

Figure 4:
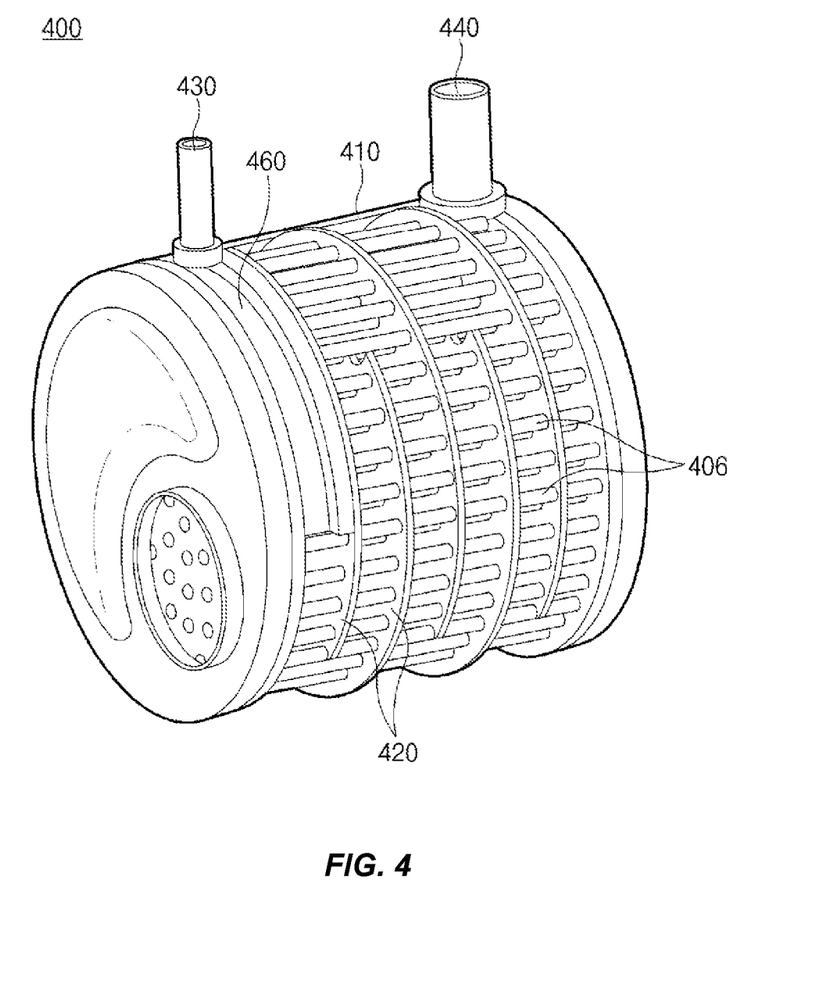
FIG. 4 is a perspective view of an exemplary exhaust side heat exchange unit.
Figure 5A:
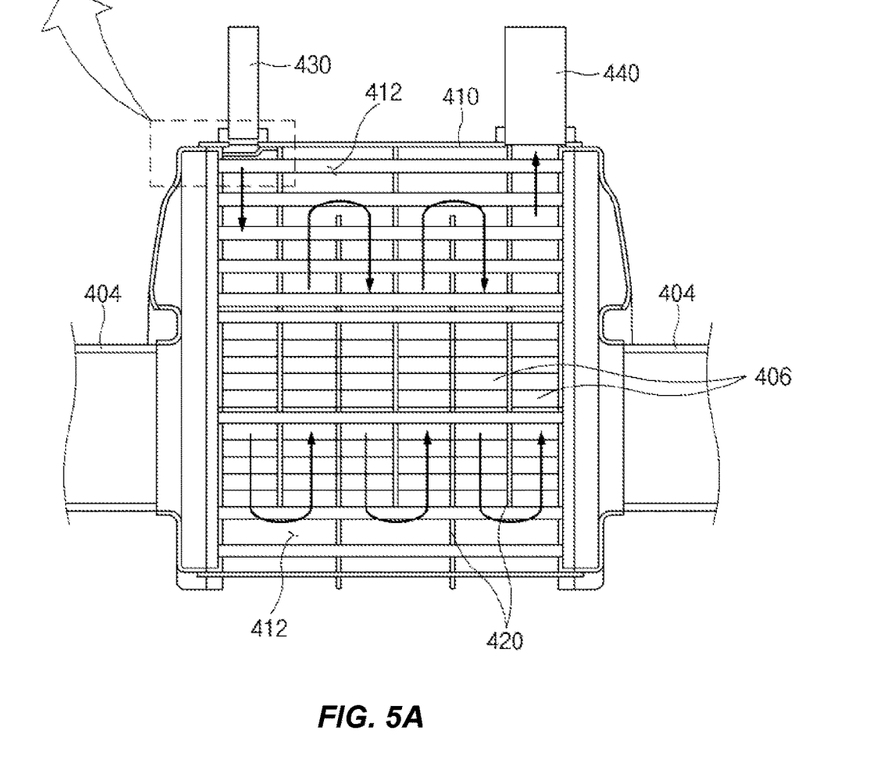
FIG. 5A is a longitudinal cross-sectional view of the exhaust side heat exchange unit illustrated in FIG. 4.

FIG. 4 is a perspective view of the exhaust side heat exchange unit and FIG. 5 is a longitudinal cross-sectional view of the exhaust side heat exchange unit illustrated in FIG. 4. A discharge path of the exhaust gas and the exhaust side heat exchange unit 400 will be described with reference to FIGS. 1, 4, and 5.

As illustrated in FIG. 1, in the internal combustion engine in which a turbo charger is mounted, the exhaust gas discharged through the exhaust manifold 3 rotates an intake side impeller 6A formed in the same axis with an impeller 6B while rotating the impeller 6B formed at an end of the exhaust manifold 3 of an exhaust pipe 406 side at a high speed, such that excessively supplied air may be introduced into the intake manifold 2 through an intercooler 5 and an engine radiator 4. The exhaust gas passing through the impeller 6B may sequentially pass through a post-processing unit 402 and the exhaust side heat exchange unit 400 through the exhaust pipe 406 and then be discharged outside the internal combustion engine. Herein, the post-processing unit 402 is mounted in the exhaust line to reduce pollutants of the exhaust gas and may include a catalytic converter, active carbon, and the like.

When the post-processing unit 402 intends to purify the exhaust gas, there is a need to increase the temperature of the exhaust gas. For this reason, the exhaust side heat exchange unit 400 may be disposed at the downstream side of the post-processing unit 402 mounted in the exhaust line.

The discharge path of the exhaust gas from the internal combustion engine mounted with the turbo charger is described with reference to FIG. 1, but in the case of a natural intake type internal combustion engine in which the impellers 6A and 6B are not formed, the exhaust gas discharged from the exhaust manifold 3 may pass through the post-processing unit 402 and the exhaust side heat exchange unit 400 through the exhaust pipe 404 in order and then may be discharged outside the internal combustion engine.

The exhaust side heat exchange unit 400 includes an exhaust gas pipe 406 through which the exhaust gas flows, a heat exchange chamber 410 configured to have a chamber inlet 430 which is received in the exhaust pipe 406 and is introduced with the working fluid and a chamber outlet 440 through which the working fluid is discharged, and baffles 420 configured to partition an internal space of the heat exchange chamber 410 into a plurality of areas along a longitudinal direction of the exhaust pipe 406, in which at least some of the baffles 420 may be provided with communication holes 412 through which the working fluid moves from one area of the internal space of the heat exchange chamber 410 to another area adjacent thereto.

Figure 5B:
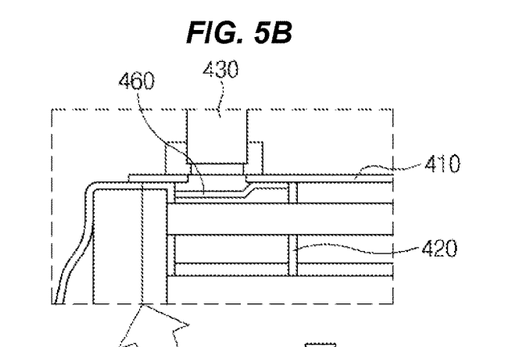
FIG. 5B is an enlarged detailed view of a portion of the exhaust side heat exchange unit illustrated in FIG. 5A.

The communication hole 412 formed in any one of the baffles 420 and the communication hole 412 formed in another baffle 420 adjacent thereto may be disposed at opposite sides to each other. In this case, the working fluid may meanderingly move the areas partitioned by the baffles 420 along an arrow direction illustrated in FIG. 5, and since the exhaust pipe 406 of the heat exchange chamber 410 is branched into plural number, the working fluid may secure a wide contact area with the exhaust pipe 406 and may be supplied with the exhaust heat from the exhaust gas for a possible long period of time.

Figures 6A, 6B:
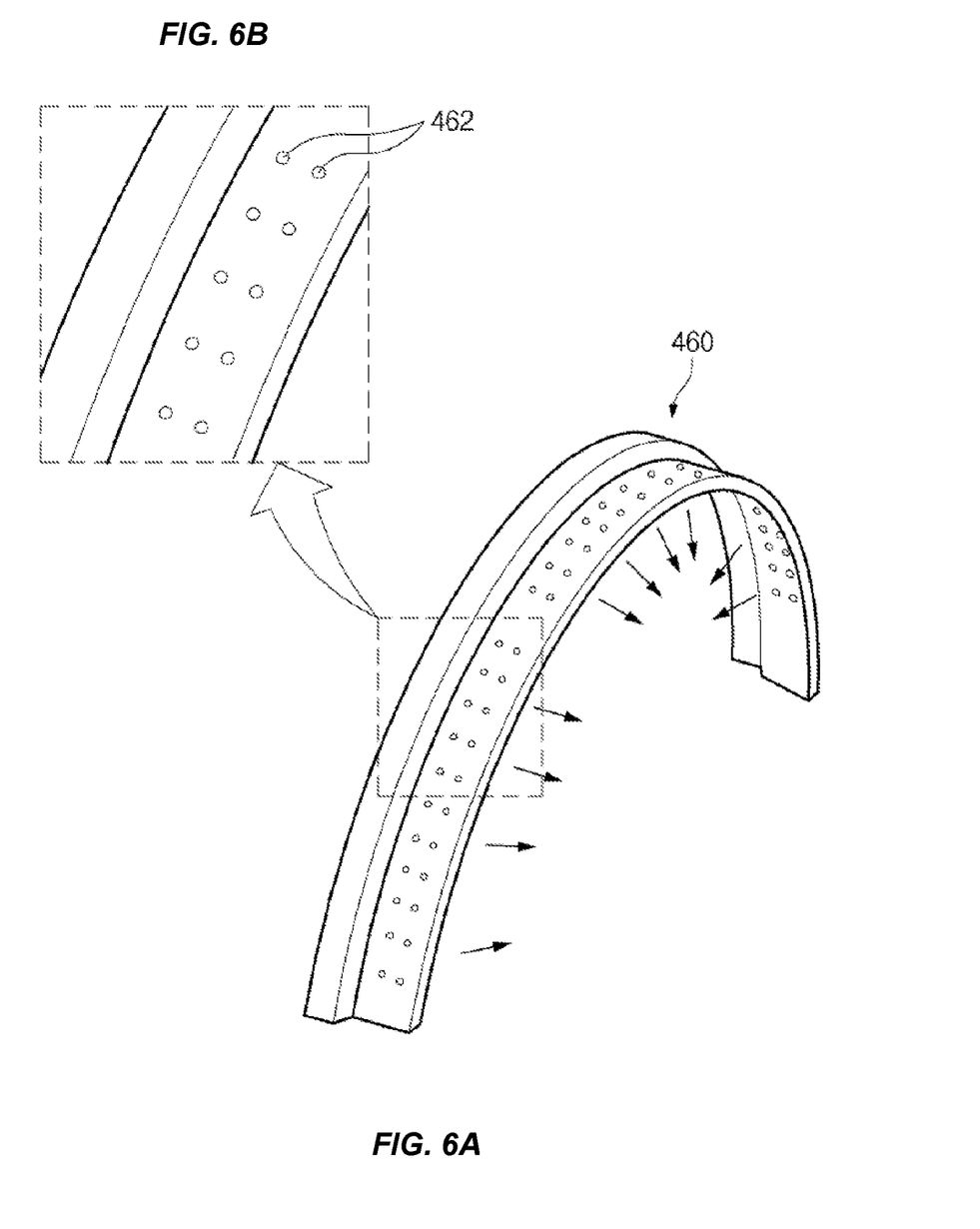
FIG. 6A is a perspective view of an exemplary nozzle plate mounted in an exemplary exhaust side heat exchange unit.
FIG. 6B is an enlarged detailed view of a portion of the nozzle plate of FIG. 6A.

FIG. 6 is a perspective view of a nozzle plate mounted in the exhaust side heat exchange unit. Referring to FIGS. 5 and 6, the exhaust side heat exchange unit 400 may include a nozzle plate 460 having a plurality of spray holes 462 to atomize the working fluid. In the state in which the nozzle plate 460 is spaced apart from an inner side of the heat exchange chamber 410, the nozzle plate 460 is formed in an inlet area which is an area connected to the chamber inlet 430 among the plurality of areas formed in the heat exchange chamber 410 and the plurality of spray holes 462 may be formed around the circumference of the nozzle plate 460. Therefore, the working fluid introduced into the heat exchange chamber 410 through the chamber inlet 430 is first introduced into a space formed between an outer peripheral portion of the nozzle plate 460 and an inner peripheral portion of the heat exchange chamber 410 and may pass through the plurality of spray holes 462 to be sprayed to the whole of the inlet area and pass through all the plurality of areas to be discharged through the chamber outlet 440.

One of the conditions most suitable to vaporize the working fluid is to maximally atomize the working fluid in the liquid state and the nozzle plate 460 formed with the spray hole 462 may significantly help to atomize the working fluid.

Figure 7:
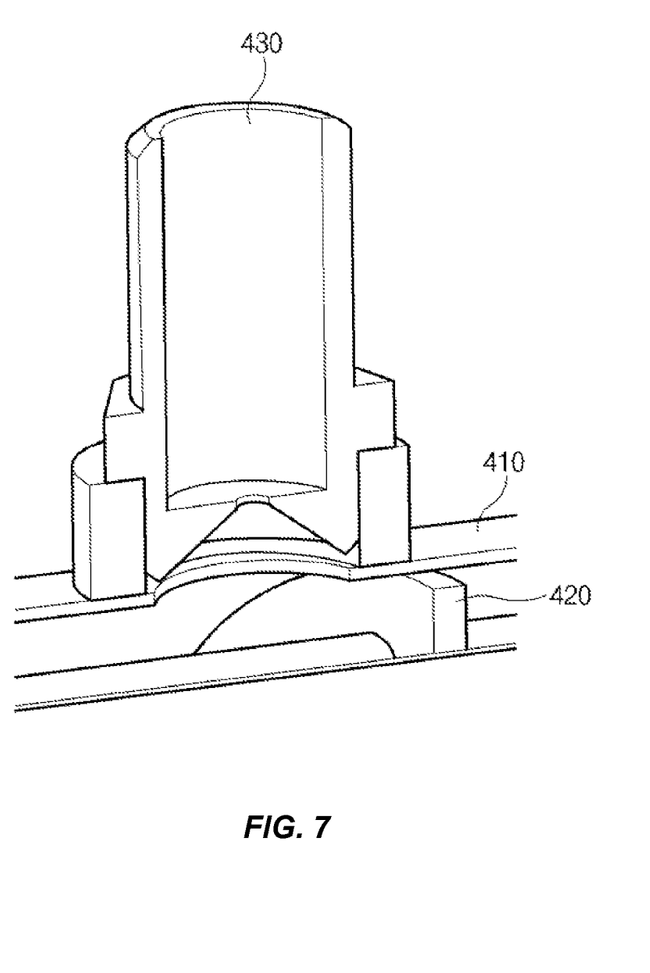
FIG. 7 is a longitudinal cross-sectional view of a modified example of a chamber inlet.

FIG. 7 is a longitudinal cross-sectional view of a modified example of a chamber inlet. Referring to FIG. 7, an internal space side end of the heat exchange chamber 410 of or at the chamber inlet 430 may have a funnel shape. In this case, the working fluid may be sprayed as soon as the working fluid passes through the chamber inlet 430 and the nozzle plate 460 may be omitted. Further, even though the chamber inlet 430 is formed as a modified example illustrated in FIG. 7, the exhaust side heat exchange unit 400 may be formed up to the nozzle plate 460. In this case, the working fluid sprayed in slightly thick particles by passing through the chamber inlet 430 may be sprayed in thinner particles by passing through the plurality of spray holes 462, such that the working fluid may be better atomized.

Hereinafter, a method of using a rotating force of the turbine 330 which rotates by the working fluid will be described.

Referring to FIG. 1, a motor generator 10 may rotate along with a rotating shaft of the turbine 330 and is supplied with the rotating force from the turbine 330 to be able to be stored in a battery 20 or supply power to the rotating shaft mounted in the internal combustion engine and is supplied with power from the battery 20 to be able supply power to the rotating shaft mounted in the internal combustion engine.

Describing in more detail, the turbine 330 and a rotor of the motor generator 10 are connected to each other in the same axis and the turbine 330 may be connected to a pulley (connected to an upper end of the turbine in FIG. 1) by a clutch, in which the clutch may disconnect the turbine 330 and the pulley from each other.

When the turbine 330 rotates, the motor generator 10 produces power and may store the produced power in the battery. When the clutch disconnects the turbine 330 and the pulley from each other, the rotation of the turbine 330 is used only in the production of power and when the clutch connects the turbine 330 and the pulley with each other, the rotating force of the turbine 330 may be used to produce power and apply power to the rotating shaft mounted in the internal combustion engine. Herein, the rotating shaft mounted in the internal combustion engine may also be a main driving shaft of the engine 1, but is not necessarily be limited thereto. For example, the rotating shaft is additionally mounted in the engine 1 such as an air conditioner pump and a cooling water pump and may be a shaft which drives apparatuses operated using the rotating force.

Further, when the working fluid is not circulated and thus the motor generator 10 is not supplied with the driving force from the turbine 330, the motor generator 10 may serve as a motor. Describing in more detail, the turbine 330 and the pulley are connected to each other by the clutch, the power passing through the inverter 30 using the battery 20 as a power source is supplied to the motor generator 10 to rotate both of the motor generator 10 and the turbine 330 and the pulley connected thereto, and since the pulley is connected to the rotating shaft mounted in the internal combustion engine by a belt (replaced by a chain, a gear, or the like), the motor generator 10 may apply power to the rotating shaft mounted in the internal combustion engine.

Meanwhile, a gear train 7 of the engine 1 may be mounted to be engaged with a power transfer part 40 and the power transfer part 40 is supplied with power from the battery 20 through the inverter 30 to be able to be used to start the engine 1 and performs a role as a driving source supplementing the engine 1 to be able to increase the output of the engine 1 or reduces the load of the engine 1 to be able to serve to increase the fuel efficiency of the engine 1.

According to the system for recycling exhaust heat from an internal combustion engine according to various embodiments of the present invention, since the exhaust side heat exchange unit 400 does not act as the exhaust resistance, it is possible to efficiently recycle the exhaust heat from the internal combustion engine without reducing the output of the internal combustion engine. According to various embodiments of the present invention, it is possible to provide the system for efficiently recycling exhaust heat from an internal combustion engine without reducing the output of the internal combustion engine. Further, it is possible to provide the system for recycling exhaust heat from an internal combustion engine without hindering the discharge of the exhaust gas.

For convenience in explanation and accurate definition in the appended claims, the terms "upper" or "lower", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for recycling exhaust heat from an internal combustion engine, comprising:
    an Exhaust Gas Recirculation (EGR) line configured to circulate a portion of exhaust gas generated from the internal combustion engine to an intake side;
    a working fluid circulation line configured to rotate a turbine with a working fluid vaporized by heat transferred from the EGR line;
    an EGR side heat exchange unit configured to thermally connect the EGR line to the working fluid circulation line to cool an EGR gas by transferring heat from the EGR gas to the working fluid;
    a reservoir tank configured to store the working fluid in a liquid state and have an inlet and an outlet; and
    a recuperator configured to be fluidically-communicated with both of the inlet and the outlet of the reservoir tank to facilitate heat-exchange between the working fluid introduced into the reservoir tank and the working fluid discharged from the reservoir tank.

2. The system according to claim 1, wherein the working fluid meets a Rankine cycle condition.

3. The system according to claim 1, further comprising:
    an exhaust side heat exchange unit configured to be mounted in an exhaust line discharging the exhaust gas to an outside to transfer heat from the exhaust gas to the working fluid.

4. The system according to claim 3, wherein the working fluid passes through the exhaust side heat exchange unit at all times, and
    the working fluid passes through the EGR side heat exchange unit only when a temperature of the EGR gas flowing along the EGR line is equal to or greater than a specific temperature T1.

5. The system according to claim 4, wherein the specific temperature T1 is 500° C.

6. The system according to claim 3, wherein the exhaust side heat exchange unit is disposed at an upstream side of the working fluid circulation line with regard to the EGR side heat exchange unit.

7. The system according to claim 3, wherein the exhaust side heat exchange unit is disposed at a downstream side of a post-processing unit disposed in the exhaust line to reduce pollutants of the exhaust gas.

8. The system according to claim 3, wherein the EGR side heat exchange unit includes:
    an EGR cooler configured to cool the EGR gas; and a super heater configured to transfer the heat from the EGR gas to the working fluid passing through the exhaust side heat exchange unit.

9. The system according to claim 8, wherein the super heater is disposed upstream of the EGR cooler based on a flow of the EGR gas introduced into the EGR side heat exchange unit.

10. The system according to claim 3, wherein the exhaust side heat exchange unit includes:
an exhaust pipe through which the exhaust gas flows;
a heat exchange chamber configured to have the exhaust pipe received therein and include a chamber inlet into which the working fluid is introduced and a chamber outlet through which the working fluid is discharged; and
baffles configured to partition an internal space of the heat exchange chamber into a plurality of areas along a longitudinal direction of the exhaust pipe,
wherein at least one of the baffles is provided with communication holes through which the working fluid moves from one area of the internal space of the heat exchange chamber to another area adjacent thereto.

11. The system according to claim 10, wherein the communication holes formed in any one of the at least one of the baffles and the communication holes formed in another one of the at least one of the baffles adjacent thereto are aligned across the corresponding baffles.

12. The system according to claim 10, wherein the exhaust side heat exchange unit includes:
a nozzle plate configured to be formed in an inlet area which is an area connected to the chamber inlet among the plurality of areas formed in the heat exchange chamber in a state in which the nozzle plate is spaced apart from an inner side of the heat exchange chamber and have a plurality of spray holes to atomize the working fluid.

13. The system according to claim 12, wherein an internal space side end of the heat exchange chamber at the chamber inlet has a funnel shape.

14. The system according to claim 1, further comprising:
a motor generator configured to rotate along with a rotating shaft of the turbine,
wherein the motor generator is supplied with a rotating force from the turbine to be stored in a battery or supply power to the rotating shaft mounted in the internal combustion engine and is supplied with power from the battery to supply the power to the rotating shaft mounted in the internal combustion engine.

15. The system according to claim 1, wherein the recuperator is disposed at an upstream side of the reservoir tank based on the inlet and a downstream side of the reservoir tank based on the outlet.

16. The system according to claim 15, further comprising:
a working fluid pump configured to be disposed between the reservoir tank and the recuperator,
wherein a pipe connecting the reservoir tank with the working fluid pump is insulated.

17. The system according to claim 15, wherein the working fluid circulation line further includes:
a working fluid bypass configured to connect a point between the EGR side heat exchange unit and the turbine and a point between the turbine and the recuperator; and
a working fluid bypass valve configured to be mounted in the working fluid bypass to selectively bypass the working fluid to the recuperator.

18. The system according to claim 1, wherein the working fluid circulation line further includes:
an oil separator configured to be formed in a pipe between the turbine and the recuperator to separate a turbine lubricant discharged from the turbine.

19. The system according to claim 1, wherein the working fluid circulation line further includes:
a TEG condenser configured to be disposed between the inlet of the reservoir tank and the recuperator to deprive the working fluid of a quantity of heat.

20. The system according to claim 19, wherein the working fluid circulation line further includes a cooling fan, and
the pipe between the recuperator and the TEG condenser is configured to include a working fluid radiator which is bent a plurality of times to increase cooling efficiency and the working fluid radiator is cooled by the cooling fan.

* * * * *